United States Patent [19]
Sturhan

[11] 3,761,045
[45] Sept. 25, 1973

[54] ADJUSTABLE SEAT
[75] Inventor: Klaus Sturhan, Lemgo, Germany
[73] Assignee: Gebr. Isringhausen, Lemgo/Lippe, Germany
[22] Filed: Apr. 19, 1972
[21] Appl. No.: 245,403

[30] Foreign Application Priority Data
Apr. 23, 1971 Germany............... G 71 15 796.5

[52] U.S. Cl............................... 248/399, 297/307
[51] Int. Cl................................................. A47c 3/30
[58] Field of Search.................. 248/399, 400, 401, 248/421, 423, 157; 297/307, 308, 309

[56] References Cited
UNITED STATES PATENTS

| | | | |
|---|---|---|---|
| 2,534,047 | 12/1950 | McIntyre | 248/400 |
| 2,562,041 | 7/1951 | Keller et al. | 297/307 |
| 2,636,544 | 4/1953 | Hickman | 248/399 |
| 3,109,621 | 11/1963 | Simons et al. | 248/399 |
| 3,144,270 | 8/1964 | Bilancia | 248/399 |

FOREIGN PATENTS OR APPLICATIONS

| | | | |
|---|---|---|---|
| 2,004,147 | 11/1969 | France | 297/307 |
| 480,931 | 8/1929 | Germany | 297/307 |
| 1,188,960 | 3/1965 | Germany | 248/399 |

Primary Examiner—Marion Parsons, Jr.
Attorney—Michael S. Striker

[57] ABSTRACT

A seat member is horizontally mounted on a pair of scissor-like arranged levers for movement in upward and downward directions. A fixed frame portion extends in a generally upward direction and is adjacent at least in part to the seat member. A shock absorber is pivotally connected to the seat end of the seat member and to the frame portion. A spring, whose tension can be adjusted, is also connected to both the seat member and to the fixed frame portion. The vertical position of the seat member is adjustable by changing the pivot connection of the shock absorber to different positions along the fixed frame portion.

2 Claims, 2 Drawing Figures

PATENTED SEP25 1973　3,761,045
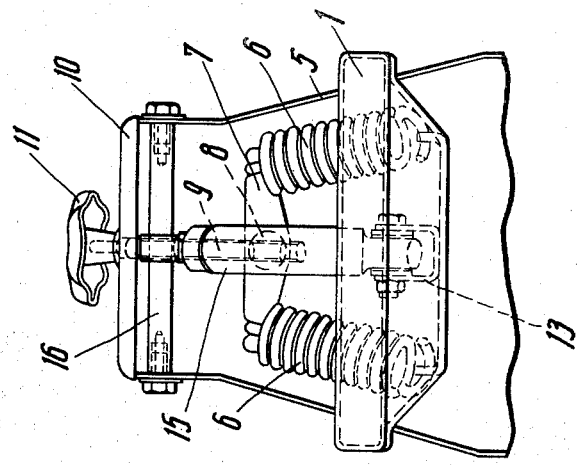
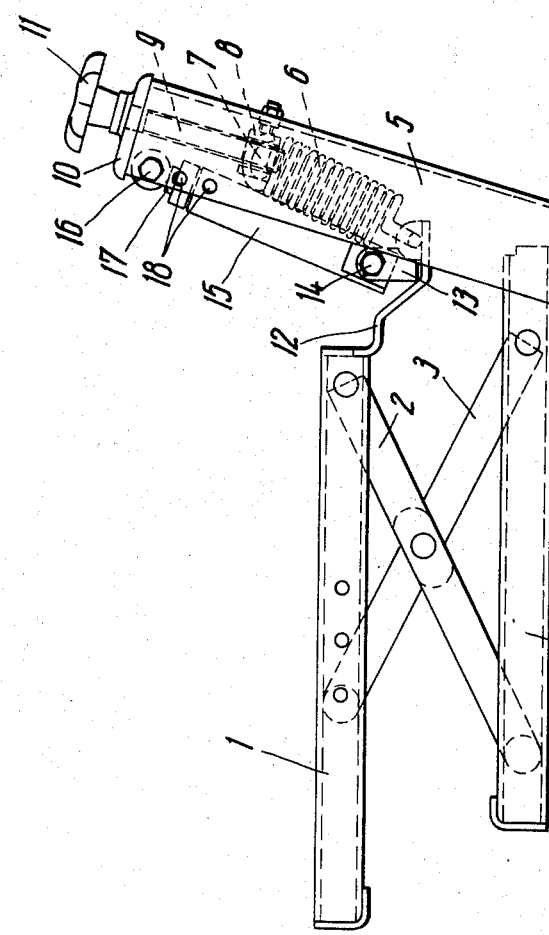

ADJUSTABLE SEAT

BACKGROUND OF THE INVENTION

The present invention relates to adjustable seats, and particularly to a seat whose height is easily adjustable without the seat moving in a forward or rearward direction, to thereby make the seat especially suitable for motor vehicles.

Adjustable seats which are utilized in motor vehicles are already known. Some of the known adjustable seats make use of springs and shock absorber systems for maintaining the position of the seat at a preadjusted level while seeking to isolate the seat from the shocks and vibrations to which the vehicle is subjected. However, the known seats of this type have the disadvantage that the seats are adjustable by sliding the same in an upward or downward direction while they are guided in a track in back of the seat. Since the backs of seats are generally inclined at a slight angle for the comfort of the person sitting in the seat, this has resulted in the disadvantage that moving the seat in an upward and downward direction has simultaneously resulted in components of movements of the seat in a forward or rearward direction. By making the forward or rearward position of the seat a function of the height, this has resulted in some discomfort to some drivers who have found themselves to be too close or too far away from the pedals in the automobile.

Such vehicle seats are relatively low in their overall height, in that the springs and shock absorber systems are arranged rearwardly of instead of under the seat. However, there are associated with the prior art construction certain disadvantages since the carrier part which supports the seat is generally rearwardly inclined for the comfort of the passenger. The seats in these embodiments are generally pivotally mounted to the floor of the vehicle by means of links which are pivotally connected to the floor as well as to the front of the seat. With such an arrangement, the seat does not remain perfectly horizontal, the seat moves along the carrier member in an upward and downward position, but the front of the seats tilt to a slight angle either above or below the back of the seats. This adds additional discomfort to the passenger and particularly to a driver whose ability to manipulate the foot pedals has thereby been hampered.

SUMMARY OF THE INVENTION

Accordingly, it is an object of the present invention to provide an adjustable seat which does not have the disadvantages known in the prior art for similar seats.

It is another object of the present invention to provide an adjustable seat which is simple in construction and economical to manufacture and which is particularly adapted for use in automobiles.

It is still another object of the present invention to provide an adjustable seat of the type under discussion wherein the seat does not move in forward or rearward directions during adjustment of the height of the seat.

It is a further object of the present invention to provide an adjustable seat as described above wherein the seat remains substantially horizontal at all settings of height.

It is still a further object of the present invention to provide an adjustable seat which includes means for resiliently suspending the seat at a preselected height to isolate the seat from the shocks and vibrations of the vehicle in which the seat is mounted, and wherein the seat level is easily adjustable.

With a view of accomplishing the above objects, the present invention is for an adjustable seat, particularly for motor vehicles, which comprises a frame having a first portion which is substantially horizontal, the second portion extending upwardly from one end of the first portion. A seat member which is spaced upwardly from the first portion of said frame is provided, said seat member being substantially parallel thereto. Said seat member has an end facing the second frame portion. Mechanical connecting means are provided between said first frame portion and said seat member for supporting the latter on the former in a substantially horizontal plane when said seat member is positioned over a range of selectable spacings above said first frame portion. Means are also provided between said end of said seat member and said second frame portion for resiliently maintaining said seat member in a selected position spaced from said first frame portion.

According to a presently preferred embodiment, said second portion is inclined at an angle to the vertical direction away from said end of said seat member. Said mechanical connecting means comprises at least one pair of scissor-like arranged levers wherein said levers each have first and second ends and are pivotally connected to each other at an intermediate position between their ends. Each lever is additionally pivotally connected at one end to said seat member or said first frame portion and at the other end slidably connected to the other of said seat member or said first frame portion. Said means for resiliently maintaining said seat member comprises a shock absorber connected to said seat member and to said second frame portion and adjustable spring means connected to said seat member and to said second frame portion for restoring said seat member to a selected position in response to a downward force applied to the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side elevational view of an adjustable seat in accordance with the present invention; and FIG. 2 is a partial rear section of the adjustable seat of FIG. 1.

DESCRIPTION OF THE PREFERRED EMBODIMENTS

Referring now to the drawing, the adjustable seat is shown to comprise a horizontally arranged seat member 1. Seat member 1 is shown to comprise a portion of a frame and is adapted to accept a seat that is normally used in motor vehicles, e.g. a padded seat (not shown).

The seat member 1 is supported towards both ends, front and rear, by a pair of levers 2 and 3. Lever 2 is pivotally mounted to the rear portion of seat member 1 and slideably cooperates with a first frame portion or base 4. On the other hand, the lever 3, which is pivotally connected with lever 2, is also pivotally connected to the rear of the base 4 while slideably cooperating with the seat member 1 as shown. Although a base 4 will normally be provided, this member is not entirely necessary and lever 3 can be pivotally mounted directly on the floor of the vehicle while the front end of the lever 2 can be provided with roller means or similar means for permitting front end of said lever to slide upon the floor of the vehicle. With the lever arrangement just described, it becomes evident that upward movement of seat member 1 results in movement of the two sliding ends of the levers 2 and 3 towards the rear of the seat, while lowering of the seat member 1 causes the sliding ends to move towards the front of the adjustable seat. By fixing the rear lower end of the lever 3 to a fixed part of the vehicle, such as the floor or base 4, this makes the seat member 1 move in an upward and downward direction without any significant components of movement in the forward or rearward direction of the adjustable seat arrangement.

In the rear of the base 4 is provided a second frame portion or carrier member 5 which is inclined at an angle to the vertical direction away from seat member 1, as shown in FIG. 1. If a base 4 is not provided, the carrier member 5 may be directly connected to the floor of the vehicle. However, in accordance with the presently preferred embodiment, the carrier member 5 is connected to the base 4 to fix the carrier 5 against movement.

Referring to both FIGS. 1 and 2, two springs 6 are mounted within the carrier member 5, one end of each spring being connected to one end of a symmetrical hanger 7. This can best be seen in FIG. 2.

The symmetrical hanger 7 is mounted by means of a spindle nut 8 to an adjusting spindle 9 for movement relative to a cap 10 fixed to the upper end of carrier 5. More particularly, the adjusting spindle 9 cooperates with the symmetrical hanger 7 and extends through an opening in the fixed cap 10 beyond the latter. An adjusting wheel 11 abutting against the cap 10 is fixedly connected to the adjusting spindle 9 so that the spindle nut 8 can be adjusted by the rotation of the adjusting wheel 11. In such an arrangement, the adjusting spindle 9, while controlling the position of the symmetrical hanger 7 relative to the cap 10, is itself prevented from movement along its longitudinal direction.

It is evident from the above description that when the lower ends of the springs 6 are maintained in a substantially fixed position, the tension of the springs 6 can be increased or decreased at will by rotating the adjusting wheel 11 to thereby raise or lower the symmetrical hanger 7 and correspondingly stress the springs more or less.

The rearward end of the seat member 1 is shown to be provided with a bracket 12 which extends towards the carrier member 5. The lower ends of the springs 6 are connected to the bracket 12. As can be seen in FIG. 2, the bracket 12 is provided at the center thereof with a bifurcated section 13 on which is mounted a pivot pin 14. A damper or shock absorber 15 is pivotally mounted on the bracket 12 about the pivot axis 14.

As can be seen in FIG. 2, a pivot pin 16 passes through the carrier member 5 below the fixed cap 10. The shock absorber 15 is additionally pivotally mounted thereon, said shock absorber being provided with a bumper disc 17 at the upper end thereof. The bumper disc 17 acts as a stop, as will presently be described.

As can be seen in FIG. 1, the sides of the carrier member 5 are provided with a plurality of pairs of holes 18 which are arranged spaced from each other along the carrier member 5. The corresponding holes 18 on opposite sides of carrier member 5 are spaced substantially equally so that the pivot pin 16 may be moved to any one of the pairs of holes 18.

The operation of the adjustable seat will now be described. The operation of the levers 2 and 3 has already been described above. It is clear that if seat member 1 were not coupled at a relatively fixed point, then the levers 2 and 3 would merely pivot about their common axis and collapse under the weight of the seat member 1. For this reason, carrier member 5 is provided with its suspension system as described above. It should be noted that, although the shock absorber 15 and the springs 6 have been described as being connected through the bracket 12, this bracket is not critical to the present invention and the two suspension means could equally be directly connected to the seat member 1.

The adjustable seat shown in FIG. 1 shows the position of the seat member 1 when no person is sitting on the seat so that no downward forces are applied to seat member 1. In this condition, the spring 6 supplies an upward biasing force on the bracket 12 to thereby elevate the seat member 1 to the extent permitted by the bumper disc 17 of the shock absorber 15.

If it were desired, for example, to lower the seat, the adjusting wheel can be turned so as to release or lower the symmetrical hanger 7 to thereby remove the tension forces which the springs 6 exert upon the bracket 12. After the springs 6 have been loosened, the pivot pin 16 can be moved to a lower pair of holes 18. Once the shock absorber 15 has thus been lowered, the adjusting wheel 11 can again be rotated in a direction to stress the springs 6 and thereby restore the original upward biasing forces which said springs apply to the bracket 12 and the seat member 1. It is clear, therefore, that the same resilient suspension may be easily achieved at any selected height of the seat member 1.

Although only one pair of levers 2 and 3 have been shown, it is, of course, possible to utilize two pairs of said levers, one on each side of the seat. Also, although two springs 6 have been shown, it is possible to carry out the present invention by solely making use of one such spring or a larger number of springs.

It will be understood that each of the elements described above, or two or more together, may also find a useful application in other types of seats differing from the types described above.

While the invention has been illustrated and described as embodied in an adjustable seat, particularly motor vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a vehicle seat, a combination comprising a seat frame having a stationary lower seat part and a movable upper seat part; a rear support rigidly connected to said lower seat part and extending at an obtuse angle to the latter so as to define a desired position of a seat back; a bracket rigidly attached to said upper seat part and extending rearwardly therefrom; spring means and shock absorber means adjustably accommodated in said rear support and being attached to said bracket; and support means connecting said upper seat part with said lower seat part and comprising scissor-like levers constituting the only connection between said upper and said lower seat parts to restrict the upper seat part to substantially vertical movement relative to said rear support and said lower seat support.

2. A vehicle seat according to claim 1, in which said shock absorber means and said spring means are adjustable independently of each other.

* * * * *